April 16, 1940.     C. SANFORD, JR     2,197,245
ROTATABLE LINE GUIDE TIP FOR FISHING RODS, ETC
Filed Feb. 6, 1939
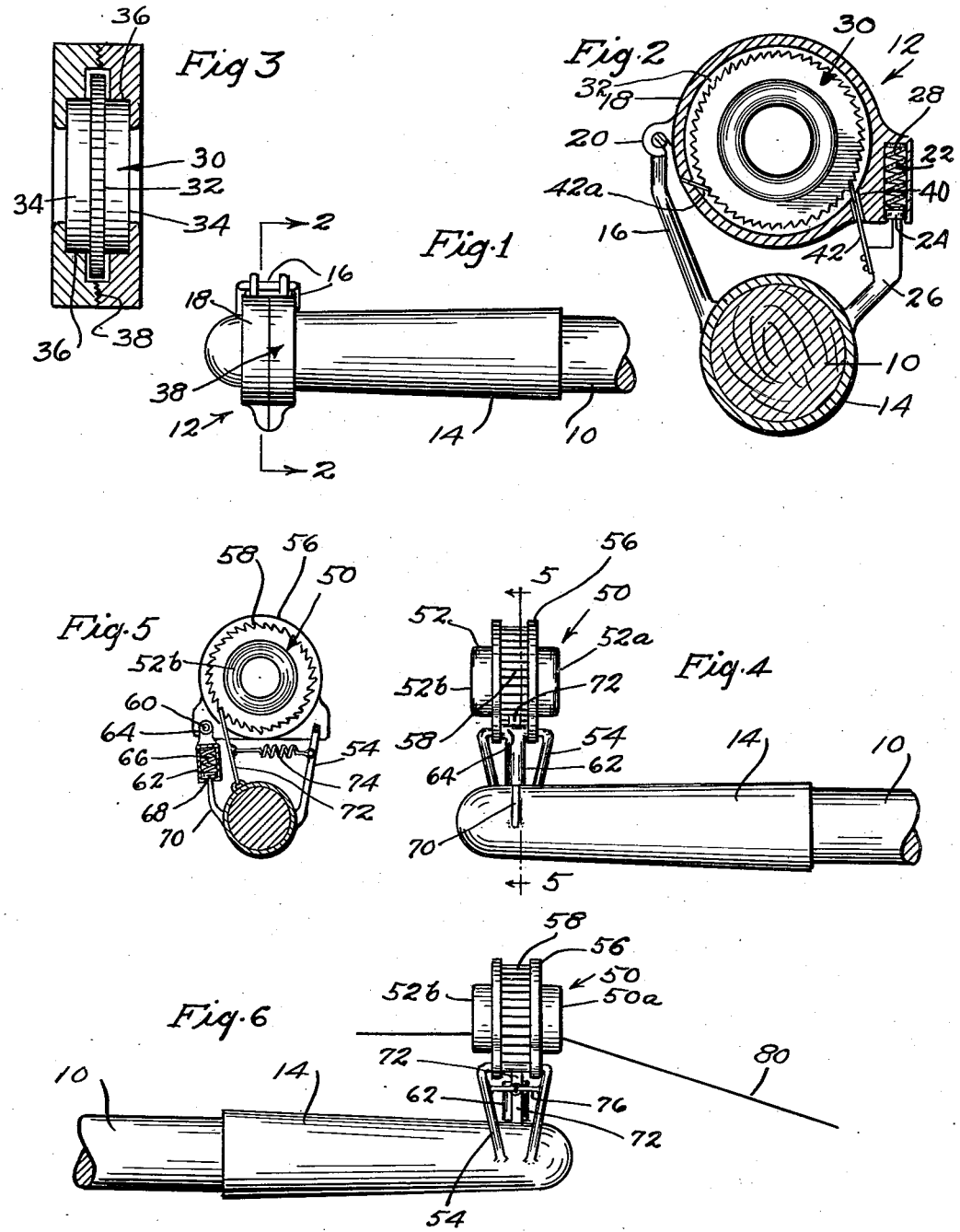
INVENTOR.
Cyrus Sanford Jr.
BY Robt. F. Woolsey
ATTORNEY.

Patented Apr. 16, 1940

2,197,245

UNITED STATES PATENT OFFICE 2,197,245

ROTATABLE LINE GUIDE TIP FOR FISHING RODS, ETC.

Cyrus Sanford, Jr., Venice, Calif.

Application February 6, 1939, Serial No. 254,796

3 Claims. (Cl. 43—24)

The device of the present invention is an improvement of and upon my present co-pending application for United States Letters Patent, identified as follows, Serial Number 166,811, filed October 1, 1937, and entitled, Line guide tips for fishing rods, and the present application is a continuation in part thereof, as per requirement set forth in paper Number 3 of the aforementioned application.

The object of the invention is to provide a more simple and practical and efficient means to rotate a line guide tip for fishing rods whereby wear or grooving of the tip will be practically eliminated, by reason of the fact that the eyelet through which the line passes is moved from time to time, thereby distributing the eyelet wear over the whole of the interior surface of the eyelet.

Other objects, features, and advantages of the invention may be apparent from the accompanying drawing, the specification, and the subjoined claims.

In the drawing of which there is one sheet:

Figure 1 is a view in plan showing the device of this invention mounted upon the tip of a fishing rod.

Figure 2 is a transverse sectional elevation taken on line 2—2, in Figure 1.

Figure 3 is a longitudinal sectional elevation of the device shown in Figures 1 and 2, showing the rotatable eyelet per se.

Figure 4 is a side elevation of a modified form of the device previously described.

Figure 5 is a sectional elevation of the form of the invention shown in Figure 4, the view is substantially that taken on line 5—5, in Figure 4.

Figure 6 is a side elevation showing structure seen upon the opposite side of the showing in Figure 4.

Referring now to the drawing, the reference character 10 indicates a fishing rod upon which the device 12 of this invention is adapted to be mounted. The rotatable line guide 12 comprises a thimble 14 from which a closed bracket 16 extends upwardly and which bracket is adapted to hingedly support a casing 18 by means of hooks 20 which are formed integrally or otherwise upon the side of the casing in substantially the manner shown in Figure 2.

The casing 18 is formed with a well or recess 22 upon the side opposite the hooks 20, and is adapted to receive a small piston 24 formed upon the upper end of a second fixed bracket or arm 26 which is also fixedly secured to the thimble 14. A spring 28 is placed within the recess 22 thereby forming a resilient cushion for the piston 24 which cushion normally holds the casing 18 in a normal horizontal position substantially as shown in Figure 2.

A rotatable eyelet 30 having a circumferentially extending rack 32, and having oppositely extending annular flanges or collars 34, is adapted to be housed within the casing 18 in such manner that the flanges 34 are journalled in the bearing 36 formed in the casing and form a guide for paying out and reeling in fishing line. This structure is shown in Figure 3. The casing is preferably formed in halves which are joinable by any convenient and practical means such as by spot welding effected after the casing halves are formed and the parts thereof assembled.

The casing 18 is provided with a slot 40 within which a piece of flat thin spring steel 42 is adapted to extend, the steel finger 42 being suitably secured at its one end to the arm 26, while its opposite end is adapted to engage the teeth of the annular rack 32 as the eyelet 30 is rotated in the manner to be subsequently described in connection with the description of operation.

In the form of the invention illustrated in Figures 4, 5, and 6, which may be considered the preferred form of the present invention, the rotatable eyelet 50 is formed in substantially the same manner as the previously described eyelet in connection with Figures 1 to 3 inclusive, the principal distinction being that the eyelet is formed with annual flanges 52 which extend beyond and overhang the supporting frame 54 of the eyelet, thereby tending to prevent the fishing line, not shown, from becoming tangled or snarled in the said supporting frame.

The eyelet 50 is journalled in annular rings 56 in such manner that the flanges 52a and 52b are individually supported and rotatable therein, thus placing the annular rack 58 adjacent the inner sides of the rings 56.

The rings 56 which are as previously stated, spaced by the rack 58, are in turn hingedly supported upon the supporting frame 54, which is fixedly secured to the thimble 14 in substantially the same manner as the bracket 16 in the form of the invention illustrated in Figures 1 to 3 inclusive. The opposite sides of the rings 56 are formed in such manner as to provide journals or bearings for a pin 60 which extends there between as shown in the drawing.

A cylinder 62, formed with a sleeve 64 extending transversely of the axis of the cylinder 62, is adapted to receive an extensile spring 66 one end of which abuts the upper end of the cylinder, while the opposite end thereof rests upon a piston 68 formed integrally with an arm 70, which is in turn fixedly secured to the thimble 14 in substantially the same manner as that previously described in reference to Figures 1 to 3 inclusive. The sleeve 64 is fitted over the pin 60 thereby providing a degree of adjustment or adjustability for the cylinder 62 so that the device may function in the manner contemplated. A pawl 72 linked or otherwise secured to the thimble 14 is adapted to engage the teeth of the rack 58 as the same is moved in digit rotation. A spring 74 secured at its one end to the pawl 72 and at its opposite end to a transverse member 76 in the frame 54, is adapted to hold the pawl in engagement with the teeth of the rack 58.

Operation of the device is as follows:

The device of this invention is used in the manner customary with those rods equipped with line reels, and as previously mentioned the purpose of the invention is to prevent line guide grooving which ordinarily results from drawing in the line especially when surf fishing for in this type of work the line becomes impregnated with grit or sand and has a very decided abrasive action on the line guide, at the tip end of the rod.

The weight or sinker used in surf fishing is quite heavy because of the force of eddies and other currents, hence in reeling in a line such as indicated at 80, considerable pressure is placed upon the collar of the eyelet, and since one side of the eyelets support, that is either the casing 18 or the rings 56, is yieldably supported upon the springs 22 or 66 depending upon the form of the invention used, the eyelet will be forced downward upon the spring, except for the interposition of the pawl 72 which is in engagement with the teeth of the annular rack 56, however, since the eyelet is adapted to rotate in its support, continued pressure on the eyelet will cause it to rotate through an arc which is equivalent to the distance between adjacent teeth on the rack, thus limiting further rotation thereof. Subsequent easing of pressure on the line and eyelet permit the spring to force the eyelet and associated structure to normal position pending the next subsequent application of pressure upon the line.

From the foregoing description it will be apparent that each application of and subsequent release of pressure upon the eyelet will cause the same to be rotated through an arc which is proportional to the space between the teeth on the rack, thereby preventing repetitious grooving of the same area of the line guide.

It is obvious that various changes and modifications and variations may be made in practicing the invention in departure from the particular showing of the drawing and description as given, without however, departing from the true spirit of the invention as defined by the scope of the appended claims.

I claim:

1. In a line guide for fishing rods, a housing structure, an eyelet within said housing structure, having the open ends thereof extending in clearance of said housing structure whereby a line will not chafe against said housing structure, collars upon said eyelet to rotatably support the same in said housing, a thimble, a bracket upon said thimble, hooks on said housing structure, said hooks being adapted to loosely engage said bracket, a cylindrical well upon said housing structure, an arm upon said thimble, said arm being adapted to support a piston operable within said well, a spring within said well and interposed between said piston and an end wall in said well whereby said housing structure may yieldingly move in a downward direction, a ratchet wheel upon said eyelet, a pawl upon said arm, said pawl being adapted to engage said ratchet wheel to force the same in a rotational direction when said housing structure is moved downwardly.

2. In a line guide for fishing rods, an eyelet, flanges on said eyelet, annular rings, said annular rings being adapted to receive said flanges whereby said eyelet may be rotatably supported, a thimble, a frame on said thimble to hingedly support said rings on one side thereof, a cylinder pendently supported by said annular rings, a piston within said cylinder, an arm secured to said thimble to support said piston, a spring in said cylinder and interposed between said piston and an end wall of said cylinder whereby said annular rings may be yieldingly supported in a normal position, teeth on said eyelet, a pawl hingedly positioned on said thimble and adapted to engage said teeth, and a spring to hold said pawl in engagement with said teeth.

3. In a line guide for fishing rods including an eyelet through which said line is paved, means to cause said eyelet to rotate an integrated distance upon application of pressure upon said eyelet, said means comprising, rings to support said eyelet, means to hingedly support said rings upon one side thereof, spring means to yieldably support said rings upon the other side thereof, teeth on said eyelet, a pawl in adjustable relation to said teeth, means to hold said pawl in engagement with said teeth, and a thimble to secure all of said structure upon the tip of a fishing rod.

CYRUS SANFORD, Jr.